United States Patent [19]

Anbar

[11] 4,042,755
[45] Aug. 16, 1977

[54] METHOD AND APPARATUS FOR ELECTROCHEMICAL GENERATION OF POWER FROM HYDROGEN

[76] Inventor: Michael Anbar, 960 Ilima Way, Palo Alto, Calif. 94306

[21] Appl. No.: 630,337

[22] Filed: Nov. 10, 1975

[51] Int. Cl.² .............................................. H01M 8/18
[52] U.S. Cl. ........................................ 429/16; 429/17
[58] Field of Search ........................... 136/86 A, 86 R

[56] References Cited

U.S. PATENT DOCUMENTS

| 775,472 | 11/1904 | Jone | 136/86 A |
|---|---|---|---|
| 3,741,809 | 6/1973 | Anabar | 136/86 A |

*Primary Examiner*—John H. Mack
*Assistant Examiner*—H. A. Feeley

[57] ABSTRACT

Method and apparatus for the pollution-free generation of electrical power from hydrogen in which molten lead is electrochemically oxidized to produce lead oxide and electricity in a single cell in which the resulting lead oxide is simultaneously converted back to lead metal by thermochemical reduction with hydrogen fuel, the entire process being carried out in a single cell using a molten salt as electrolyte in a temperature range of 500° to 900° C. The entire cycle consumes only hydrogen and oxygen, while producing electricity.

8 Claims, 2 Drawing Figures

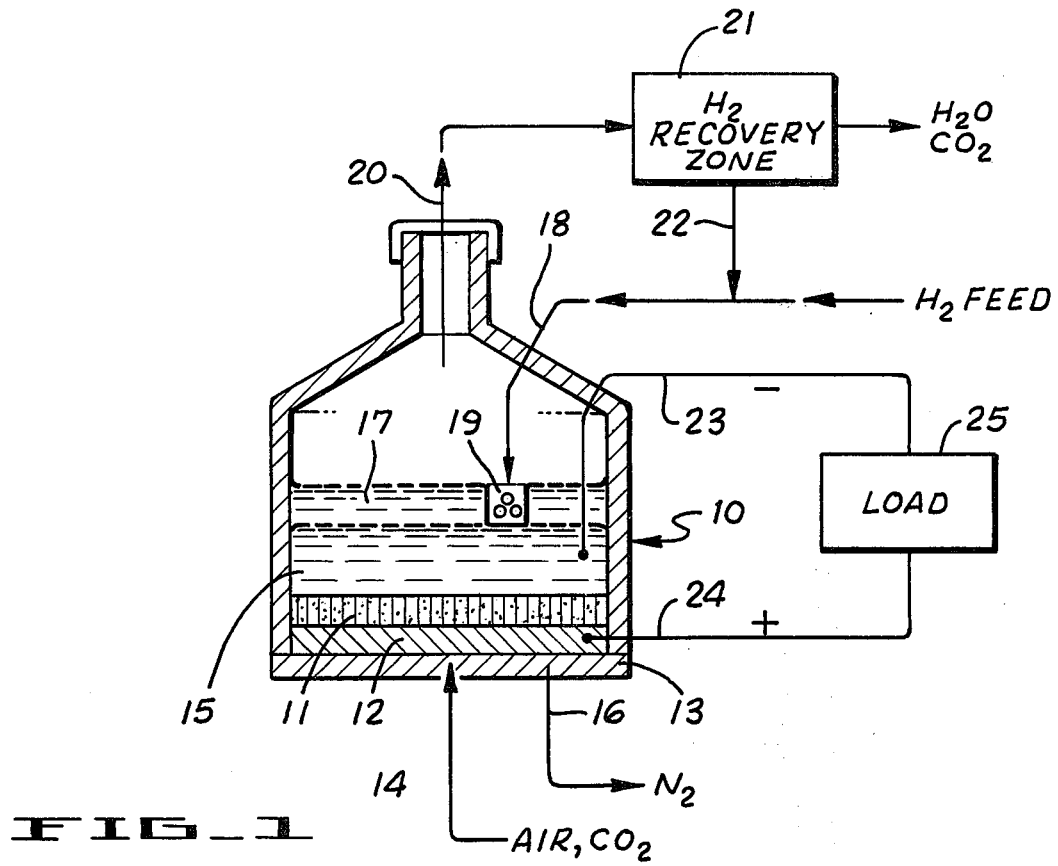
FIG_1
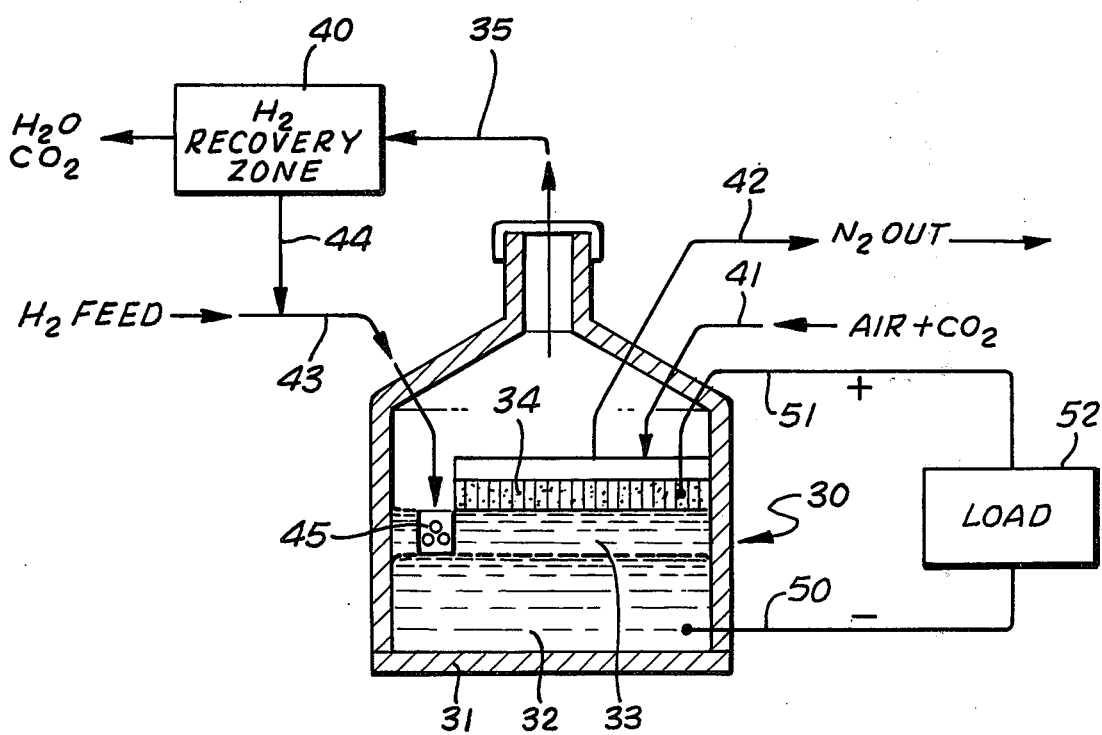
FIG_2

METHOD AND APPARATUS FOR ELECTROCHEMICAL GENERATION OF POWER FROM HYDROGEN

BACKGROUND OF INVENTION

The invention described herein was made in the course of work under a grant or award from the United States National Science Foundation.

U.S. Pat. No. 3,741,809, issued June 26, 1973, to M. Anbar (herein the "Anbar" patent), discloses a method and apparatus for the pollution-free generation of electrochemical energy from coal or other carbonaceous fuels. The process there disclosed is a cyclical one in which a metal of the group consisting of lead, bismuth and antimony is first oxidized with oxygen at high temperatures in an electrochemical cell containing a molten salt electrolyte, the cell being one wherein said metal is the anode and wherein oxygen is supplied at the cathode. The resultant oxidation of the metal generates the electromotive force. The formed metal oxide, e.g., PbO, is taken up by the molten salt and carried to an adjacent regeneration chamber to which carbonaceous fuel is supplied to reduce the metal oxide back to the form of metal which separates in molten form from the molten salt and is returned to the electrochemical cell to continue the cycle. While a practice of the method disclosed in the Anbar patent will theoretically produce an open cell voltage of approximately 0.76 volt at 450° C or 0.7 volt at the more efficient operating temperature of 600° C, the effective, or load voltage which can be obtained therefrom as a practical matter at 600° C does not exceed about 0.5 volt or about 0.4 volt at 800° C. The invention disclosed in the Anbar patent is assigned to the assignee of the present invention, and the subject matter of the said patent is specifically incorporated herein, by reference, for background information.

It is an object of this invention to provide a method and apparatus which, while utilizing an electrochemical cell of the type disclosed in the Anbar patent, is nevertheless capable of providing much higher open circuit and operating voltages. A more particular object is to provide a cell structure which eliminates the necessity for material transport from the regeneration reactor to the electrochemical cell and vice versa. It will be observed that in the simple metal-air cell disclosed by Anbar the voltage is necessarily limited to that provided by the free energy of formation of the metal oxide, e.g., PbO, at unit activity. The free energy released by subsequent chemical reduction of the metal oxide is not available as electric power. It is a further object of this invention to provide a method and apparatus wherein both the free energy of formation of the metal oxide and the free energy released by chemical reduction of said oxide become available as electric power, the resulting voltage tending to assume a higher value as determined by the more negative free energy of formation of water.

SUMMARY OF THE INVENTION

It has been found that the foregoing and other objects of the invention can be obtained by integrating the separate metal oxidation and the metal oxide reduction steps, as taught by Anbar, into a single unit adapted to rapidly convert the metal oxide back to the molten metal in situ, and by employing hydrogen gas as the fuel to effect the metal oxide reduction. The use of hydrogen rather than a solid carbonaceous material as the fuel overcomes the critical material transport problems inherent in the use of coal, or the like, as added in a separate regeneration chamber. Further, the integration of the respective metal oxidation and metal reduction steps into a single cell unit results in an electrochemical converter unit with a much higher voltage than obtainable from a metal-air cell in which the metal oxide (e.g., PbO) is at unit activity. The entire process is carried out at temperatures ranging from about 500° to 900° C in an electrochemical cell provided with a molten salt electrolyte to which hydrogen is added so as to reduce the metal oxide being continuously formed in the cell back to the molten metal state substantially as fast as the said oxide is produced. This method has the effect of keeping the activity of the metal oxide well below unity and of thus increasing the cell voltage.

The entire cyclic operation of the present invention consumes only hydrogen and oxygen while producing electricity and water, the system being capable of providing effective, or load voltages of above about 0.7 volt at 800° C. This represents a clear improvement of at least a 40% increase in efficiency over a nonintegrated system of the type disclosed in the Anbar patent.

The electrochemical cells of the present invention are those having an anode made up of a layer of an appropriate molten metal having good thermodynamic efficiency and a relatively low melting point as typified by lead, bismuth and antimony, for example. The cell is provided with one or more layers of a molten salt, typically a mixture of alkali metal carbonates, chlorides or fluorides, which constitute the electrolyte, as well as with a cathode member capable of reducing oxygen supplied thereto and thereby generating the desired electromotive force. The cell contains a free-flowing layer of the molten salt, with any other molten salt layer present being immobilized by containment in a suitable support such as alumina or the like. The free-flowing salt layer overlies the molten metal (which may also be termed the "salt regeneration layer")and interfaces therewith, said salt layer being provided with a supply of hydrogen gas in such amounts as to rapidly convert (reduce) the metal oxide (formed by reaction of the molten metal with the reduced oxygen) back to the molten metal state. When the cathode is positioned above the molten lead layer, it is spaced therefrom by the said free-flowing, molten salt layer, which is also in contact with the cathode. On the other hand, when the cathode is placed below the molten metal it is spaced therefrom by an immobilized layer of molten salt which is free of added hydrogen. The two salt layers need not have the same composition. Both types of cell structure are described below in connection with the accompanying drawing.

The net reaction taking place in the electrochemical cell employed in the present invention is to oxidize the hydrogen fuel to water and to produce electrical power. The water vapors so formed are released from the cell along with some unreacted hydrogen and, in some cases, along with carbon dioxide. Carbon dioxide can also be added with the oxygen (air) supplied at the cathode whenever it is required in the cathode reaction or otherwise to prevent decomposition (at cell operating temperatures) of any molten carbonate salts employed as electrolytes. It will thus be seen that the invention provides a method whereby the energy present in hydrogen can be recovered with a high degree of efficiency, as evidenced by the relatively high voltages which characterize the cell's output of electrical current. This result is obtained without at the same time generating harmful polluting gases. Any hydrogen sulfide admitted to the cell as an impurity in the hydrogen feed becomes bound into the molten salt layer, for subsequent release therefrom, ultimately as elemental sulfur, by the practice of conventional processing techniques.

Of the various metals which can be melted and successfully employed in the electrochemical cell, lead, bismuth and antimony constitute a preferred class. In turn, lead is the preferred metal of this class due to its relatively low cost, good thermal efficiency and comparatively low melting temperature. The present invention, for convenience, will hereinafter be described as it relates to the use of molten lead as the cell anode.

A variety of salts, or mixtures of salts, can be employed to form the molten salt layer in the cell, the important criteria being that the salt composition becomes molten at temperatures between about 400° and 800° C, that the molten salt be alkaline and relatively stable at operation conditions ranging from about 500° to about 900° C, that it be relatively inert to lead and lead (or other metal) oxides, that it have a resistivity of the order of about 0.05 and 0.5 ohm-cm., that it be relatively non-corrosive and that it catalyze the reduction of metal oxides by hydrogen. Alkali metal carbonates, for example, all have these desired qualities. A preferred salt composition adapted for use in the present invention comprises a mixture of sodium, potassium and lithium carbonates. As indicated above, any tendency of these salts, notably $K_2CO_3$, to decompose at operating temperatures above about 500° C is suppressed by the addition of carbon dioxide gas to the cell at the cathode.

The cathode element of the cell to which oxygen and other gases are supplied is one of a conventional character and can be a porous ceramic material coated with silver, copper oxide of NiAg which acts to catalyze formation of oxide ions ($O^{2-}$) or carbonate ions ($CO_3^{2-}$). In lieu of the coating, silver screen can be employed to this same end. These ions which form at the cathode then react with the lead to form lead oxide, carbon dioxide also being released when carbonate salts are employed. The lead oxide, which may be partially soluble in the free-flowing molten salt regeneration layer, rapidly reacts with the hydrogen fuel and is thus reduced to metal form, it dropping back into the underlying body of molten lead constituting the cell anode.

The amount of hydrogen fuel to be supplied to the cell for admixture with the free-flowing molten salt layer may be varied over a relatively wide range. However, it is normally added in such amounts as to be present in excess, thus speeding up and maximizing the reduction of lead oxide to molten lead. A certain amount of unreacted $H_2$ is, of course, discharged from the cell along with water vapor, such hydrogen being readily recoverable, on condensing out the $H_2O$, for recycling to the cell.

Various of the reactions which take place in the cell of the present invention are as follows:

$$Pb(l) + \tfrac{1}{2} O_2 \rightarrow PbO + \text{electricity}$$

$$PbO + H_2 \rightarrow Pb(l) + H_2O$$

The first reaction written above represents a summary of the following reactions when a carbonate electrolyte is employed:
Cathode reaction $CO_2 + \tfrac{1}{2} O_2 + 2e^- \rightarrow CO_3^{2-}$
Anode reaction $Pb + CO_3^{2-} \rightarrow PbO + CO_2 + 2e^-$ When a non-carbonate electrolyte is employed, the following reactions take place:
Cathode reaction $\tfrac{1}{2} O_2 + 2e^- \rightarrow O^{2-}$
Anode reaction $Pb + O^{2-} \rightarrow PbO + 2e^-$

DESCRIPTION OF PREFERRED EMBODIMENTS

The invention will be more clearly understood by reference to the figures of the appended drawing wherein:

FIG. 1 represents a schematic flow diagram of an embodiment of an electrochemical cell of the present invention which contains both a free-flowing molten salt layer as well as an immobilized molten salt layer; and FIG. 2 represents another embodiment of electrochemical cells of the present invention which embodies only a free-flowing molten salt layer.

Referring more particularly to FIG. 1 of the drawing, there is shown an electrochemical cell made up of a generally cylindrical vessel 10 having an open bottom into which is fitted a porous sintered alumina disk 11 impregnated with molten salt held immobilized by capillary forces in the said alumina disk. A silver screen cathode member 12 is maintained against the lower surface of the alumina disk 11 by a bottom member 13. The latter member is adapted to receive air and $CO_2$ gases through line 14. Oxygen and $CO_2$ pass upwardly to screen 12 and pass through disk 11 as carbonate ions which, in turn, pass into a body 15 of molten lead supported on the upper surface of the alumina disk 11. The capillary forces holding the molten carbonate in the latter are sufficiently strong that the adjacent molten lead cannot pass therethrough. The nitrogen admitted to the bottom member 13 is discharged at 16. Supported upon the molten lead layer is a layer 17 of molten alkali metal carbonates, said salt layer being freeflowing and containing hydrogen fuel along with a certain amount of lead oxide. Hydrogen fuel is supplied via line 18 for release to the layers 15 and 17 through a nozzle 19. Gases $CO_2$, $H_2$ and $H_2O$ vent through line 20 for passage to a hydrogen recovery zone 21 from which hydrogen is recycled to the cell through lines 22 and 18. An electrical connection is shown at 23 leading from the molten lead which acts as the anode, while a similar connection is shown at 24 leading from the silver screen cathode, the resulting circuit incorporating the load 25.

In laboratory operation, the cell is brought up to operating temperatures of 500° – 900° C and maintained thereat by placing the same in a furnace (not shown). The reactions in the cell are exothermic overall, and under practical conditions of heat conservation, no further heating of the cell is required once the same reaches operating temperatures.

Referring to FIG. 2 of the drawing, there is shown at 30 an electrochemical cell made up of a vessel 31 having a layer of molten lead 32, serving as a cell anode, lying at its bottom. Floating on the lead layer is a free-flowing layer 33 of molten alkali metal carbonates. Supported adjacent the salt layer 33 is a 2-layer porous cathode 34 having a CuO facing which is in contact with the upper surface of the said salt layer. This cathode member 34 is so shaped as to cover less than the entire surface of salt layer 33, leaving space for product gases to exit from the cell through line 35. Air and $CO_2$ are supplied to the cell via line 41, with nitrogen in the feed gases being discharged through line 42, Hydrogen is supplied to the cell through line 43, along with recycled hydrogen recovered from zone 40, taken through line 44, said hydrogen being released to the salt layer 33 through a nozzle 45. An electrical connection is shown at 50 leading from the molten lead, while a similar connection is shown at 51 leading from the cathode with the resulting circuit incorporating the load 52.

The following example is illustrative of the practice of the present invention in one embodiment thereof:

EXAMPLE

In this operation there is employed a cell of the type illustrated in FIG. 1. The cathode is made up of a silver screen maintained in close contact with the lower surface of a porous sintered alumina disk approximately 3 mm thick impregnated with molten alkali metal salts (40 mole % $Li_2CO_3$ and 30% each of $Na_2CO_3$ and $K_2CO_3$). This support was overlaid with a molten layer of lead approximately 5 mm thick, this layer, in turn, supporting a free-flowing molten carbonate film layer, approximately 1 mm thick, of the same composition as contained in the alumina support. As the fuel, the space over the molten salt layer is supplied with a 10% mixture of hydrogen in helium. In making up the electrical circuit, the contact with the lead cathode was by way of an iridium wire, while a silver wire was employed as a connection to the silver cathode. In operation at 752°, the open circuit patented of the cell was 1.32 volts. In operation at 2 $mA/cm^2$ nominal current density, the cell voltage slowly declined from an initial closed circuit valve of 1.29 volts to an apparent steady state valve of 0.69 volt. This closed circuit valve is 0.19 volt above the open circuit valve calculated for a lead-air cell at this temperature with unit activity of lead oxide. Moreover, for more than 30 minutes the operating voltage of the cell was maintained above 1.0 volt. Had hydrogen not been present in the anode compartment the voltage would by this time have fallen to less than 0.7 volt.

We claim:

1. An apparatus for the continuous generation of an electromotive force from hydrogen which comprises in combination, an enclosed electrochemical vessel, a silver screen cathode disposed along a lower surface of the vessel, conduit means disposed for passing air and carbon dioxide from outside the vessel to the silver screen cathode, nitrogen conduit means disposed for discharging from the vessel nitrogen from the introduced air, a porous sintered alumina disk impregnated with molten salt, said molten salt being immobilized by capillary forces in said alumina disk, the said alumina disk being disposed over the silver screen cathode, a layer of molten metal supported on the upper surface of the alumina disk, a free-flowing molten alkali metal carbonate layer supported over the molten metal layer, hydrogen conduit means disposed for passing hydrogen fuel to the molten alkali metal carbonate layer, a vent for passage of gases from the vessel to a hydrogen recovery zone, a first electrical connection leading from the molten metal layer serving as an anode, and a second electrical connection leading from the silver screen cathode, said first and second electrical connections being electrically joined to a load.

2. The apparatus of claim 1 wherein hydrogen recovered at the hydrogen recovery zone is recycled to the hydrogen feed conduit.

3. The apparatus of claim 1 wherein the molten alkali metal carbonate consists essentially of lithium carbonate, sodium carbonate and potossium carbonate.

4. The apparatus of claim 1 wherein the molten metal is a member of the group consisting of lead, antimony and bismuth.

5. An apparatus for the continuous generation of an electromotive force from hydrogen which comprises in combination, an enclosed electrochemical vessel, a layer of molten metal disposed in the vessel, a free-flowing molten alkali metal carbonate layer supported over the molten metal layer, hydrogen conduit means for passing hydrogen fuel to the molten alkali metal carbonate layer, a two-layer porous cathode supported over the molten alkali metal carbonate layer, said porous cathode having a CuO facing in contact with the upper surface of the said alkali metal carbonate layer and being shaped less than the entire surface of the said alkali metal carbonate layer, conduit means for supplying air and carbon dioxide from outside the vessel to the two-layer porous cathode, nitrogen conduit means disposed for discharging from the vessel nitrogen from the introduced air, a vent for passage of gases from the vessel to a hydrogen recovery zone, a first electrical connection leading from the molten metal layer serving as an anode, and a second electrode connection leading from the said cathode, said first and second electrical connections being electrically joined to a load.

6. The apparatus of claim 5 wherein hydrogen received at the hydrogen recovery zone is recycled to the hydrogen feed conduit.

7. The apparatus of claim 5 wherein the molten alkali metal carbonate consists essentially of lithium carbonate, sodium carbonate and potossium carbonate.

8. The apparatus of claim 5 wherein the molten metal is a member of the group consisting of lead, antimony and bismuth.

* * * * *